United States Patent [19]

Tanazawa et al.

[11] Patent Number: 5,733,942
[45] Date of Patent: Mar. 31, 1998

[54] PHENOLIC RESIN FORMING MATERIAL AND METHOD OF MANUFACTURING SAME

[75] Inventors: Hisaji Tanazawa, 1-8-4, Hanazono Higashimachi, Higashiosaka-shi, Osaka; Takeshi Hirohata, Kawachinagano; Ryutaro Nishimura, Higashiosaka, all of Japan

[73] Assignee: Hisaji Tanazawa, Osaka, Japan

[21] Appl. No.: 719,774

[22] Filed: Sep. 25, 1996

[51] Int. Cl.$^6$ .................................................. C08H 11/24
[52] U.S. Cl. ............................ 521/40; 525/480; 525/504
[58] Field of Search ............................ 521/40; 525/480, 525/504

[56] References Cited

U.S. PATENT DOCUMENTS 4,118,346  10/1978  Summers .................................. 521/40

OTHER PUBLICATIONS

Horiuchi et al., CA 99:177,077, Abstracting Netsukokasei Jushi, 4(2), 63, 1983.
Ide, CA 126:118,581, Abstracting JP08301962, 1996.
Lignyte Co. Ltd., WPIDS Database AN 97-048378, Abstracting JP08301962A, 1996.

Primary Examiner—Jeffrey C. Mullis
Attorney, Agent, or Firm—Felfe & Lynch

[57] ABSTRACT

This invention relates to a granular phenolic resin forming material. Grains are obtained by pulverizing a hardened phenol resin or epoxy resin, particularly a waste, having aromatic rings. The grains are heated to react with a phenolic substance, to solubilize at least surfaces thereof, whereby the grains are made formable again. The pulverized, hardened grains and the phenolic substance, preferably a phenol, are mixed in the ratio of 100/10 to 100/90. An acid catalyst may be used, as necessary, in a quantity not exceeding 9 parts. A preferred reaction temperature is 80° to 180° C. at atmosphere pressure. The forming material of this invention may be formed with hexamine compounded therewith.

9 Claims, No Drawings

PHENOLIC RESIN FORMING MATERIAL AND METHOD OF MANUFACTURING SAME

BACKGROUND OF THE INVENTION

1. Field of the Invention

This invention relates to a phenolic resin forming material and a method of manufacturing same. More particularly, the invention relates to a phenolic resin forming material and a method of manufacturing same, in which a crosslinked thermosetting resin is regenerated by chemical treatment to be settable through crosslinking.

2. Description of the Related Art

Conventionally, it has been considered impossible that a crosslinked thermosetting resin (having set through crosslinking) can be regenerated to mold again. The wastes of crosslinked resin were treated only by combustion. Horiuchi et al. have reported a method of liquefying and recycling hardened phenol resin and expoxy resin by heating them with a large excess quantity of phenol for 4 to 5 hours (Netsukokasei Jushi, 4 (2), 63 ('83)).

However, the method of Horiuchi et al. requires a large quantity of phenol, and must cause a reaction of formalin to enable molding. This method requires a new raw material and increased steps to be taken before recycling.

Inventors have found through research that a crosslinked thermosetting resin may be pulverized into gains (powder), followed by solubilization of at least part of the grains, particularly surface portions thereof which contact a phenolic substance acting as a decomposition reagent. Then, the grain aggregate has a fluidity and crosslink setting property necessary for molding and shaping. This invention is based on this finding.

SUMMARY OF THE INVENTION

This invention provides a phenolic resin forming material and a method of manufacturing same, in which a hardened thermosetting resin, particularly a waste material, is pulverized into grains, and at least part of the hardened resin is solubilized by heating and causing a reaction of the resin in the presence of a phenolic substance, with an acid catalyst added thereto as necessary, thereby giving the resin a fluidity and crosslink setting property necessary for molding and shaping. The term grains used herein includes those presenting a powdery outlook in that small grain sizes are in effect powdery.

According to this invention, all thermosetting resins having chemical structures polymerized through methylene bonds or dimethylene ether bonds by causing formalin to react to a compound having an aromatic ring may be regenerated as a starting material. It is also possible to regenerate resins having bisphenol A skeletons in which aromatic rings are linked through iso-propylidene bonds. Thus, specific examples include phenol resins and epoxy resins.

Phenolic substances are suited as a processing chemical for use in the reaction. Phenol is particularly preferred from the viewpoint of cost. Preferably, the quantity of the phenolic substance used in the reaction is 10 to 90 parts to 100 parts by weight of the thermosetting resin grains. An acid catalyst may be added in a quantity not exceeding 9 parts by weight, if necessary.

This invention obtains a forming material by heating and reacting pulverized grains of a hardened thermosetting resin in the presence of a phenolic substance, with an acid catalyst added as necessary, thereby solubilizing at least part of the hardened resin. However, the chemical structure of the crosslinked and hardened thermosetting resin cannot be determined correctly. It is therefore unclear what reaction mechanism causes solubilization. Since the crosslinking reaction is caused by formalin or the like, the solubilization is considered due to breaking of methylene group ($-CH_2-$) or dimethylene ether bonds ($-CH_2-O-CH_2-$) by formalin.

Thus, according to this invention, all thermosetting resins having chemical structures linked aromatic rings through methylene bonds or dimethylene ether bonds formed by aromatic rings causing a reaction of formaldehyde.

Examples of such resins include novolac type phenol resins, resol type phenol resins, bisphenol A type epoxy resins and novolac type epoxy resins. Epoxy resins may be hardened using amine or acid anhydride as hardner. This is because the skeleton of an epoxy resin has a structure in which aromatic rings are linked through methylene bonds as a result of reaction with formaldehyde. Once the methylene bonds are broken, the resin is solubilized regardless of the reaction mode of the epoxy group. A bisphenol A epoxy resin has no methylene bonds or dimethylene ether bonds, but is synthesized using acetone. This epoxy resin has bisphenol A as its basic skeleton having a structure in which two benzene rings are linked through an iso-propylidene bond. This iso-propylidene bond also is broken through an acid decomposing reaction. Thus, the epoxy resin may be used as a starting material according to this invention. Other resins having a bisphenol skeleton condensed by using ketones or aldehydes, e.g. acetaldehyde may also be used as starting materials according to this invention.

The hardened phenol resins, according to this invention, are not limited to phenol resins in the narrow sense, but include, for example, cresol resin, phenol-furfural resin, phenol resin incorporating toluene, resorcinol resin, phenol resin with a reaction of epichlorohydrin.

Generally, polymerization of a phenol resin is divided into three stages, i.e. A-stage, B-stage and C-stage. A-stage represents an initial stage of reaction between phenol and formaldehyde, which is called resol also. In this stage, the substance has small molecular weight with minimal three-dimensional crosslinks, is soluble in a solvent, and may be liquefied by heating to be flowable liquid. B-stage is reached after a further polymerization from A-stage, with a certain extent of three-dimensional crosslinking. The substance in this stage is insoluble but swells in a solvent such as alcohol or acetone. It does not melt but softens when heated, and is called resitol also. C-stage is reached after a further polymerization from B-stage, and the substance is now an insoluble and infusible high polymer with three-dimensional crosslinks, which is called resite also (c.f. A Dictionary of Polymers, Taiseisha).

As used in this specification, the term "solubilization" means breaking of methylene crosslinks to change thermosetting resins from C-stage to B-stage or to a state having even less crosslinks. Generally, in a reaction between a granular material and a liquid reagent, the reaction progresses inwardly from surface portions so that the reaction is the more pronounced toward the surfaces. Thus, "solubilization" according to this invention mainly represents B-stage state, but may partly include A-stage state.

The thermosetting resins used in this invention as starting materials may include a filling or reinforcing material, with the resins acting as matrices. Such filling or reinforcing material includes glass fiber, asbestos and other inorganic fibers, cellulose (paper and the like) and other organic fibers, wood flour and other organic fillers, and inorganic fillers. Typical examples of such thermosetting resin moldings are used as insulating boards and other parts of electrical devices, and as housing materials.

Preferably, the thermosetting resins used in this invention are pulverized into grains. Solubilization reaction with phenols progresses the faster the larger the surface area is. The resins after the reaction may be used as they are. Preferably, the size of such grains is up to 30 mesh (grain diameter: ca. 0.5 mm). A larger grain size would result in a large size of regenerated forming material in C-stage, and fine cavities could not be filled in time of molding. The pulverized grains may be used as they are, or may be screened as necessary to be used as a powdery material having a certain degree of uniformity in grain size.

The thermosetting resins used in this invention as starting materials may be phenol resins or epoxy resins. Whichever is the case, a forming material regenerated according to this invention is hardenable through a crosslinking reaction similar to that of a phenol resin. Thus, the forming material belongs to phenolic resin forming materials. That is, according to the regenerating conditions by this invention, though not accurately ascertainable, it is considered that methylene bonds or dimethylene ether bonds forming crosslinks are dissociated to form methylol groups or the like, whereby parts of the material are in the state of or before B-stage, swollen or dissolved in phenol. These methylol groups, or methylol groups remaining unreacted in the thermosetting resin acting as a starting material are considered to crosslink again involving aromatic rings in the phenol acting also as the solvent and the phenol acting as resin raw material.

The phenols used in this invention are considered to act mainly as solvents for swelling or dissolving resins and to form a skeleton of a regenerated forming material by being incorporated into the hardening reaction in time of regeneration. Further, the phenols may possibly act as reagents in the regenerating reaction to break methylene bonds and the like. Phenols having such action are not limited to phenols such as phenol and alkylphenol having one hydroxyl group linked to an aromatic ring, but include phenolic compounds such as cresols, xylenols, resorcinols and catechols. However, phenol is preferred from the viewpoint of cost.

In this invention, an acid catalyst may be used as necessary. Such acid catalysts include organic acids such as p-toluensulfonic acid, xylenesulfonic acid and phenolsulfonic acid, and inorganic acids such as sulfuric acid, nitric acid, phosphoric acid and condensed phosphoric acid. Particularly preferable is a nonvolatile acid which does not evaporate in time of heating. Use of such an acid speeds up the reaction of hardened resins from C-stage to B-stage or earlier stage, and also improves formability of regenerated phenol resin forming materials obtained. However, use of an acid catalyst may be undesirable, depending on intended use of regenerated phenol resin forming materials. In such a case, no catalyst is used, but an increased reaction temperature and reaction time may be adopted.

Where an acid catalyst is used, its preferred quantity is up to 9 parts by weight to 100 parts by weight of a thermosetting resin. The acid catalyst used in excess of 9 parts by weight would corrode dies used and insert metal pieces inserted into moldings when forming the regenerated resins. However, phosphoric acid or condensed phosphoric acid having minimal corrosive action may advantageously be used in excess of 9 parts by weight.

It is preferred, according to this invention, that 10 to 90 parts phenol are added 100 parts thermosetting resin grains. If less than 10 parts phenol are used, little is changed to B-stage by solubilization, resulting in insufficient fluidity and hardenability for molding. If more than 90 parts phenol are used, the whole resin is changed to A-stage to be melted. To obtain a forming material, formalin must be added to the resin to change it to B-stage. This is undesirable in that wasteful quantities of phenol and energy are used, along with increased processing steps, to increase cost.

A preferred reaction temperature, according to this invention is 80° to 180° C. A reaction progresses below 80° C. but it takes a long time. Above 180° C., an intensive evaporation of phenol takes place to impair operating environment, and the ratio of phenol to the resin cannot be controlled. It is to be noted, however, that the above temperature range is suited to use of an ordinary open type reacting device. The invention does not exclude higher reaction temperatures for a pressure-resistant, sealed type device.

The reaction time should be adjusted according to the type and quantity of a catalyst used, and the type and the like of a thermosetting resin used as the raw material. Generally, 30 to 100 minutes are appropriate under the conditions of the above preferred temperature range and catalyst quantity. Where the catalyst is used in an increased quantity, the process may be done in 5 minutes or so. The time may be further reduced where the process is executed with a pressure-resistant, sealed type device.

A phenol resin forming material obtained according to this invention may be hardened and molded by compounding and technique similar to handling of a virgin phenol resin forming material. Use of hexamine is particularly preferred since it reduces molding time.

It is of course possible to use a virgin phenol resin forming material along with a phenol resin forming material obtained according to this invention.

When molding a regenerated phenol resin forming material according to this invention, it is possible to add a filling material such as glass fiber, asbestos and other inorganic fiber, cellulose (paper and the like) and other organic fiber, wood flour and other organic filler, or an inorganic filler. Where grains of a hardened thermosetting resin used in this invention as the starting material are added, the entire re-molding may be recycled as re-forming material in accordance with this invention, which is particularly advantageous for the purpose of reducing waste.

According to this invention, waste of the hardened thermosetting resin pulverized into grains may be recycled as a forming material which is itself hardenable through a reaction, instead of using such grains as a filler or extender. This makes a great contribution to a reduction of wastes and effective use of resources.

DESCRIPTION OF THE PREFERRED EMBODIMENTS

An embodiment of this invention will be described hereinafter. This embodiment relates to a phenol resin, but this invention is not limited to the phenol resin. The basic reaction in this invention is breaking by phenols of methylene bonds and the like or crosslinks using ketones or aldehydes which are a cause of three-dimensional crosslinking of resins in which aromatic rings are crosslinked and hardened with formaldehyde.

In this embodiment, a phenol is used as a processing chemical only by way of example.

In the following description, numerical values expressed as "parts" represent those in "parts by weight".

[Embodiment 1]

A known phenol-formaldehyde resin forming material (flow: 30 mm, gel time: 55 sec., ortho-para orientation ratio: 55/45) synthesized with hydrochloric acid and oxalic acid acting as catalysts was heated at 120° C. for 90 min. to change it to B-stage. This B-stage product was pulverized to 60 mesh or below. A fully hardened product after heating at 180° C. for 30 min. was pulverized to 60 mesh or below to obtain a hardened phenol resin (C-stage). Ten parts phenol and one part para-toluensulfonic acid were added to and mixed well with 100 parts of this hardened phenol resin. The mixture was uniformly heated at 150° C. for 30 min. A regenerated phenol resin forming material was obtained, in which crosslinks up to B-stage were present inwardly from surfaces of C-stage resin grains.

The regenerated phenol resin forming material was molded, using plating dies, at a temperature of 160° C. and under a pressure of 150 kgf/cm$^2$ for 10 min.

The plate formed was tested for bending strength and elastic modulus based on JIS K-6911.

[Embodiment 2]

90 parts phenol and 9 parts para-toluensulfonic acid were added to and mixed well with 100 parts of the hardened phenol resin in Embodiment 1. The mixture was uniformly heated at 150° C. for 30 min. A regenerated phenol resin forming material was obtained in accordance with the object of this invention. This material was shaped and evaluated as in Embodiment 1.

[Embodiment 3]

10 parts phenol were added to and mixed well with 100 parts of the hardened phenol resin in Embodiment 1. The mixture was uniformly heated at 150° C. for 75 min. A regenerated phenol resin forming material was obtained in accordance with the object of this invention. This material was shaped and evaluated as in Embodiment 1. No acid catalyst was added in regenerating the phenol resin forming material.

[Embodiment 4]

90 parts phenol were added to and mixed well with 100 parts of the hardened phenol resin in Embodiment 1. The mixture was uniformly heated at 150° C. for 75 min. A regenerated phenol resin forming material was obtained in accordance with the object of this invention. This material was shaped and evaluated as in Embodiment 1. No acid catalyst was added in regenerating the phenol resin forming material.

[Embodiment 5]

30 parts phenol and 5 parts concentrated nitric acid were added to and mixed well with 70 parts of the hardened phenol resin in Embodiment 1 (i.e. 42.8 parts phenol and 7 parts concentrated nitric acid to 100 parts hardened phenol resin). The mixture was uniformly heated at 150° C. for 20 min. A regenerated phenol resin forming material was obtained in accordance with this invention. This material was shaped and evaluated as in Embodiment 1.

[Embodiment 6]

30 parts phenol and 3 parts para-toluensulfonic acid were added to and mixed well with 70 parts of the hardened phenol resin in Embodiment 1 (i.e. 42.8 parts phenol and 4.28 parts para-toluensulfonic acid to 100 parts hardened phenol resin). The mixture was uniformly heated at 180° C. for 15 min. A regenerated phenol resin forming material was obtained in accordance with this invention. This material was shaped and evaluated as in Embodiment 1.

[Embodiment 7]

30 parts phenol and 3 parts para-toluensulfonic acid were added to and mixed well with 70 parts of the hardened phenol resin in Embodiment 1 (i.e. 42.8 parts phenol and 4.28 parts para-toluensulfonic acid to 100 parts hardened phenol resin). The mixture was uniformly heated at 80° C. for 3 hours. A regenerated phenol resin forming material was obtained in accordance with this invention. This material was shaped and evaluated as in Embodiment 1.

[Embodiment 8]

A prepreg impregnated with a virgin phenol resin varnish is compacted on paper acting as a base material. The resulting insulating plate having 50 parts phenol resin and 50 parts paper was pulverized to 60 mesh or below to obtain paper-compounded phenol resin grains. Five parts phenol and 0.5 part para-toluensulfonic acid were added to and mixed well with 100 parts of the paper-compounded phenol resin grains (i.e. 10 parts phenol and one part acid to 100 parts of the resin in the paper-compounded phenol resin grains). A regenerated phenol resin forming material was obtained in accordance with the object of this invention, with the same conditions as in Embodiment 1.

The regenerated phenol resin forming material was formed into plate with the same conditions as in Embodiment 1.

The plate formed was tested for a Charpy impact value in order to ascertain a reinforcing effect of the paper. Further, bending strength, elastic modulus and fluidity were measured as in Embodiment 1.

[Embodiment 9]

The paper-compounded phenol resin grains of Embodiment 8 were used here. 45 parts phenol and 4.5 parts para-toluensulfonic acid were added to and mixed well with 100 parts of the paper-compounded phenol resin grains (i.e. 90 parts phenol and 9 parts acid to 100 parts of the resin in the paper-compounded phenol resin grains). A regenerated phenol resin forming material was obtained in accordance with the object of this invention, with the same conditions as in Embodiment 1. This phenol resin forming material was shaped and evaluated as in Embodiment 8.

[Embodiment 10]

The paper-compounded phenol resin grains of Embodiment 8 were used here also. 5 parts phenol were added to and mixed well with 100 parts of the paper-compounded phenol resin grains (i.e. 10 parts phenol to 100 parts of the resin in the paper-compounded phenol resin grains). The mixture was uniformly heated at 150° C. for 75 min. A regenerated phenol resin forming material was obtained in accordance with the object of this invention. No acid catalyst was added in regenerating the phenol resin forming material.

This phenol resin forming material was shaped and evaluated as in Embodiment 8.

[Embodiment 11]

The paper-compounded phenol resin grains of Embodiment 8 were used here also. 45 parts phenol were added to and mixed well with 100 parts of the paper-compounded phenol resin grains (i.e. 90 parts phenol to 100 parts of the resin in the paper-compounded phenol resin grains). The mixture was uniformly heated at 150° C. for 75 min. A regenerated phenol resin forming material was obtained in accordance with the object of this invention. No acid catalyst was added in regenerating the phenol resin forming material.

This phenol resin forming material was shaped and evaluated as in Embodiment 8.

[Comparative Example 1]

The phenol resin oligomer used in Embodiment 1 was made into B-stage by heating it at 120° C. for 90 min. This material was molded with the same shaping conditions as in Embodiment 1 (virgin phenol resin molding), and was evaluated as in Embodiment 1. This comparative example is used in order to compare physical properties of the regenerated phenol resin forming material and the molding using the virgin material.

[Comparative Example 2]

A molding was prepared with the same molding conditions as in Embodiment 1, without treating the hardened phenol resin of Embodiment 1. In this case, however, a molding in plate form was not obtained.

[Comparative Example 3]

100 parts phenol and 10 parts para-toluensulfonic acid were added to and mixed well with 100 parts of the hardened phenol resin in Embodiment 1. The mixture was uniformly heated at 150° C. for 30 min. In this case, the mixture contained a large quantity of unreacted phenol. A further heating turned the mixture into A-stage and melted the mixture. A granular forming material was not obtained.

[Comparative Example 4]

Nine parts phenol and 0.9 parts para-toluensulfonic acid were added to and mixed well with 100 parts of the hardened phenol resin in Embodiment 1. The mixture was uniformly heated at 150° C. for 30 min. In this case, the mixture contained little soluble part. The mixture was molded with the same conditions as in Embodiment 1. The resulting molding was so weak that its physical properties could not be measured.

[Comparative Example 5]

30 parts phenol were added to and mixed well with 70 parts of the hardened phenol resin in Embodiment 1 (i.e. 42.8 parts phenol to 100 parts of the hardened phenol resin). The mixture was heated at 200° C. There was a drawback in operability in that a large part of the phenol acting as a solvent evaporated. Because of the evaporation of the phenol, a molding obtained with the same conditions as in Embodiment 1 had insufficient strength.

[Comparative Example 6]

30 parts phenol and 3 parts para-toluensulfonic acid were added to and mixed well with 70 parts of the hardened phenol resin in Embodiment 1 (i.e. 42.8 parts phenol and 4.28 parts para-toluensulfonic acid to 100 parts hardened phenol resin). The mixture was heated at 70° C. Over 3 hours were needed for solubilization. A long time was lost in manufacture, which was impractical (the manufacture being discontinued).

[Comparative Example 7]

50 parts phenol and 5 parts para-toluensulfonic acid were added to and mixed well with 100 parts of the paper-compounded phenol resin grains of Embodiment 8 (i.e. 100 parts phenol and 10 parts acid to 100 parts of the resin in the paper-compounded phenol resin grains). The mixture was uniformly heated at 150° C. for 30 min. In this case, the mixture contained a large quantity of unreacted phenol. A further heating turned the mixture into A-stage and melted the mixture. A granular forming material was not obtained.

[Comparative Example 8]

4.5 parts phenol and 0.45 parts para-toluensulfonic acid were added to and mixed well with 100 parts of the paper-compounded phenol resin grains of Embodiment 8 (i.e. 9 parts phenol and 0.9 parts acid to 100 parts of the resin in the paper-compounded phenol resin grains). The mixture was uniformly heated at 150° C. for 30 min. In this case, the mixture contained little soluble part. The mixture was molded with the same conditions as in Embodiment 1. The resulting molding did not have sufficient strength for measurement of its physical properties.

The conditions for preparing the foregoing embodiments and comparative examples are listed in Tables 1 and 2. Table 1 shows those using only the phenol resin as a starting material. Table 2 shows those using, as a starting material, the phenol resin molding with paper acting as a reinforcement.

The following method was adopted for evaluating fluidity of the regenerated phenol resin forming materials manufactured in the embodiments of the invention.

The regenerated phenol resin forming material in 1 g is allowed to fall and deposit in conical form on a steel plate heated to 160° C. A full weight of 5000 kg is applied to the hot flat plate to compress the material, thereby forming a disk of resin powder. The disk thus obtained includes a highly transparent, hardened resin region disposed centrally thereof, and an opaque, hardened resin region disposed outside. An index of fluidity employed was (R/r)×100 (%) where R was a diameter of the highly transparent, hardened resin region, and r was a diameter of the disk including the opaque, hardened resin region. The larger R/r is, the greater fluidity the material has for excellent formability.

The conditions for regenerating process of the embodiments and comparative examples are listed in Tables 1 and 2, in which Table 2 shows the processing conditions for the resin molding with paper acting as a reinforcement. Table 1 shows those using only the phenol resin as a starting material. Table 2 shows those using, as a starting material, the phenol resin molding with paper acting as a reinforcement.

Evaluations of the regenerated forming materials in the embodiments and comparative examples are shown in Tables 3 and 4. Table 3 shows evaluations of those using only the phenol resin as a staffing material. Table 4 shows evaluations of those using, as a starting material, the phenol resin molding with paper acting as a reinforcement.

TABLE 1

Conditions for Regenerating Hardened Resin Having Only Phenol Resin

| | phenol added (in parts by weight) | catalyst | quant. added (in parts) by weight) | heating temp. (°C.) | heating time (min.) |
|---|---|---|---|---|---|
| Emb. 1 | 10 | p-toluensulfonic acid | 1 | 150 | 30 |
| Emb. 2 | 90 | p-toluensulfonic acid | 9 | 150 | 30 |
| Emb. 3 | 10 | none | — | 150 | 75 |

TABLE 1-continued

Conditions for Regenerating Hardened Resin Having Only Phenol Resin

| | phenol added (in parts by weight) | catalyst | quant. added (in parts) by weight) | heating temp. (°C.) | heating time (min.) |
|---|---|---|---|---|---|
| Emb. 4 | 90 | none | — | 150 | 75 |
| Emb. 5 | 42.8 | concentrated nitric acid | 7 | 150 | 20 |
| Emb. 6 | 42.8 | p-toluensulfonic acid | 4.28 | 180 | 15 |
| Emb. 7 | 42.8 | p-toluensulfonic acid | 4.28 | 80 | 180 |
| Comp. 1 | virgin phenol resin forming material | | | | |
| Comp. 2 | no regeneration (left as pulverized) | | | | |
| Comp. 3 | 100 | p-toluensulfonic acid | 10 | 150 | 30 |
| Comp. 4 | 9 | p-toluensulfonic acid | 0.9 | 150 | 30 |
| Comp. 5 | 42.8 | p-toluensulfonic acid | 4.28 | 200 | * |
| Comp. 6 | 42.8 | p-toluensulfonic acid | 4.28 | 70 | >180 |

Notes:
1) The quantities of phenol and catalyst added are shown in parts by weight with respect to 100 parts by weight of hardened and pulverized resin.
2) *: Operability problem due to conspicuous evaporation of the phenol. The attempt was discontinued before obtaining a regenerated resin forming material.

TABLE 2

Conditions for Regenerating Hardened Phenol Resin Including Paper

| | phenol added (in parts by weight) | catalyst | quant. added (in parts) by weight) | heating temp. (°C.) | heating time (min.) |
|---|---|---|---|---|---|
| Emb. 8 | 10 | p-toluensulfonic acid | 1 | 150 | 30 |
| Emb. 9 | 90 | p-toluensulfonic acid | 9 | 150 | 30 |
| Emb. 10 | 10 | none | — | 150 | 75 |
| Emb. 11 | 90 | none | — | 150 | 75 |
| Comp. 7 | 100 | p-toluensulfonic acid | 10 | 150 | 30 |
| Comp. 8 | 9 | p-toluensulfonic acid | 0.9 | 150 | 30 |

Notes: The quantities of phenol and catalyst added are shown in parts by weight with respect to 100 parts by weight of the resin (excluding paper) in hardened and pulverized phenol resin including paper.

TABLE 3

Physical Properties and Fluidity of Regenerated Phenol Resin (Only hardened phenol resin being used as starting material)

| | bending strength (kgf/mm$^2$) | elastic modulus (kgf/mm$^2$) | Charpy impact value (kgf · cm/cm$^2$) | fluidity (R/r) × 100 (%) |
|---|---|---|---|---|
| Emb. 1 | 10.3 | 680 | 1.8 | 54 |
| Emb. 2 | 10.5 | 666 | 1.8 | 100 |
| Emb. 3 | 9.95 | 657 | 1.4 | 74 |
| Emb. 4 | 5.80 | 604 | 1.4 | 100 |
| Emb. 5 | 10.7 | 680 | 1.5 | 74 |
| Emb. 6 | 10.4 | 640 | 1.4 | 94 |
| Emb. 7 | 9.80 | 605 | 1.8 | 95 |
| Comp. 1 | 9.50 | 583 | 2.4 | 67 |
| Comp. 2 | no molding obtained | | | |
| Comp. 3 | (physical properties cannot be measured) | | | |
| Comp. 4 | too weak for measurement of physical properties | | | |
| Comp. 5 | 4.30 | 550 | 1.1 | 30 |
| Comp. 6 | over 3 hours needed for solubilization. Experiment discontinued. | | | |

TABLE 4

Physical Properties of Regenerated Hardened Phenol Resin Including Paper

| | bending strength (kgf/mm$^2$) | elastic modulus (kgf/mm$^2$) | Charpy impact value (kgf · cm/cm$^2$) | fluidity (R/r) × 100 (%) |
|---|---|---|---|---|
| Emb. 8 | 2.25 | 203 | 15 | 91 |
| Emb. 9 | 5.49 | 717 | 7.4 | 100 |
| Emb. 10 | 7.42 | 770 | 4.6 | 98 |
| Emb. 11 | 7.69 | 805 | 6.8 | 100 |
| Comp. 7 | All dissolved to A-stage. Granular forming material not obtained. | | | |
| Comp. 8 | 1.45 | 230 | 0.7 | 15 |

What is claimed is:

1. A phenolic resin forming material comprising a grain aggregate formed from grains of a hardened thermosetting resin, at least the surfaces of said grains being converted mainly to the B-stage state by a phenolic substance, said grain aggregate having fluidity and crosslink setting properties neeeded for molding and shaping.

2. A phenolic resin forming material as defined in claim 1, wherein said thermosetting resin is a phenol resin or epoxy resin.

3. A phenolic resin forming material comprising grains of a hardened thermosetting resin as in claim 1 and hexamine.

4. A phenolic resin forming material as defined in claim 3, wherein said thermosetting resin is a phenol resin or epoxy resin.

5. A method of manufacturing a phenol resin forming material comprising a grain aggregate comprising the step of converting at least the surfaces of grains of a hardened thermosetting resin molding mainly to the B-stage state by heating said grains in the presence of a phenolic substance and in the presence or absence of an add catalyst, wherein said grains and said phenolic substance are mixed in a ratio by weight of 100/10 to 100/90.

6. A method of manufacturing a phenol resin forming material as defined in claim 5, wherein said phenolic substance is selected from a group consisting of phenol, cresol, xylenol, resorcinol and catechol.

7. A method of manufacturing a phenol resin forming material as defined in claim 5, wherein said phenolic substance is a phenol.

8. A method of manufacturing a phenol resin forming material as defined in claim 5, wherein said acid catalyst is added in 0 to 9 parts by weight to 100 parts of said grains.

9. A method of manufacturing a phenol resin forming material as defined in claim 5, wherein said heating was carried out in a temperature range of 80° to 180° C. at atmospheric pressure.

* * * * *

UNITED STATES PATENT AND TRADEMARK OFFICE
CERTIFICATE OF CORRECTION

PATENT NO. : 5,733,942
DATED : March 31, 1998
INVENTOR(S) : Tanazawa et al.

It is certified that error appears in the above-identified patent and that said Letters Patent is hereby corrected as shown below:

In column 1, line 28, change "gains" to -- grains --.

In column 3, line 18, change "ease" to -- case --.

In column 8, line 53, change "staffing" to -- starting --.

In column 8, Table 1, in the second line of the caption to the fourth column from the left, after "parts" delete -- ) --.

In column 9, Table 2, in the second line of the caption to the fourth column from the left, after "parts" delete -- ) --.

In Claim 1, column 10, line 62, change "neeeded" to -- needed --.

In Claim 5, column 11, line 9, change "add" to -- acid --.

Signed and Sealed this

Fourth Day of July, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,733,942
DATED      : March 31, 1998
INVENTOR(S) : Tanazawa et al.

It is certified that error appears in the above-identified patent and that said Letters Patent is hereby corrected as shown below:

On the title page, insert second assignee item [73]

-- Osaka Prefecture--.

Signed and Sealed this

Twenty-first Day of November, 2000

Attest:

Q. TODD DICKINSON

*Attesting Officer*  *Director of Patents and Trademarks*